United States Patent [19]

Tyrpin et al.

[11] Patent Number: 5,536,510
[45] Date of Patent: Jul. 16, 1996

[54] CHEWING GUM PRODUCTS CONTAINING A LIQUID ASPARTAME DISPERSION

[75] Inventors: Henry T. Tyrpin, Midlothian; Kevin B. Broderick, Berwyn, both of Ill.

[73] Assignee: Wm. Wrigley Jr. Company, Chicago, Ill.

[21] Appl. No.: 365,663

[22] Filed: Dec. 29, 1994

[51] Int. Cl.$^6$ ..................................... A23G 3/30
[52] U.S. Cl. ................... 426/4; 426/548; 426/804; 426/5
[58] Field of Search ..................... 426/3–6, 548, 426/804

[56] References Cited

U.S. PATENT DOCUMENTS

| | | | |
|---|---|---|---|
| 4,671,961 | 6/1987 | Patel et al. | 426/3 |
| 4,671,967 | 6/1987 | Patel et al. | 426/658 |
| 4,722,844 | 2/1988 | Ozawa et al. | 426/3 |
| 4,728,515 | 3/1988 | Patel et al. | 426/3 |
| 5,120,551 | 6/1992 | Yatka et al. | 426/3 |
| 5,164,214 | 11/1992 | Wild | 426/548 |
| 5,221,543 | 6/1993 | Zibell et al. | 426/3 |
| 5,279,945 | 1/1994 | Hummel | 435/24 |

FOREIGN PATENT DOCUMENTS

| | | |
|---|---|---|
| 0102032A1 | 7/1984 | European Pat. Off. . |
| WO95/15697 | 6/1995 | WIPO . |

OTHER PUBLICATIONS

Brochure entitled "NutraSweet™ Custom Liquid 50®", undated, 7 pages, The Nutra Sweet Company.

*Primary Examiner*—Jeanette Hunter
*Attorney, Agent, or Firm*—Steven P. Shurtz; Brinks Hofer Gilson & Lione

[57] ABSTRACT

Chewing gum compositions including a liquid dispersion containing aspartame and methods of making the compositions are disclosed. The liquid dispersion contains at least 20% aspartame, and preferably contains about 50% aspartame and about 50% water.

20 Claims, 1 Drawing Sheet

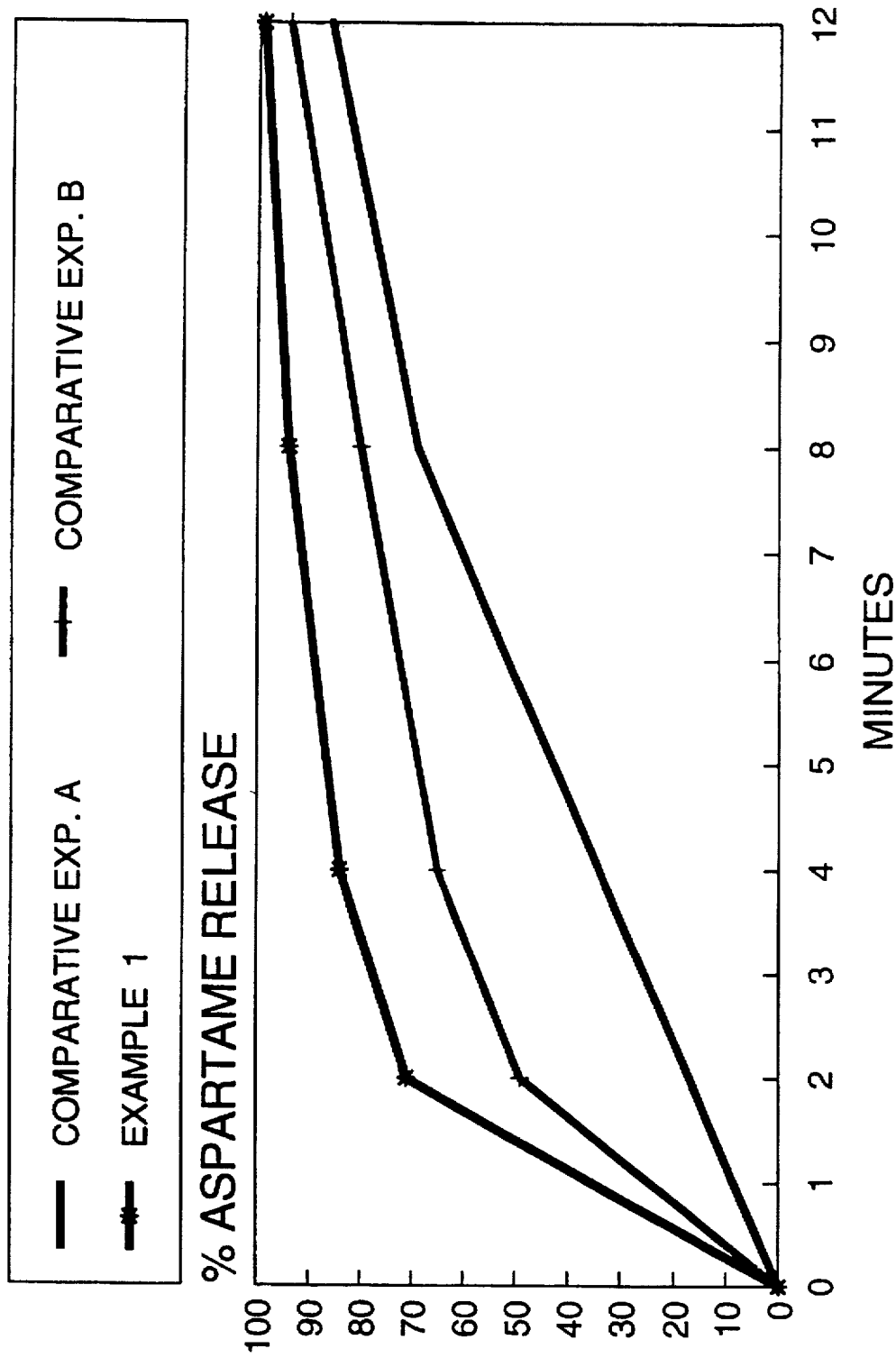

CHEWING GUM PRODUCTS CONTAINING A LIQUID ASPARTAME DISPERSION

BACKGROUND OF THE INVENTION

The present invention relates to chewing gum products. More particularly, the invention relates to the use of a liquid aspartame dispersion in chewing gum compositions and methods of making chewing gum products containing liquid aspartame dispersions.

Chewing gum compositions often contain high-intensity sweeteners such as aspartame. Sugarfree gums, developed for consumers who are interested in reducing dental caries, frequently use aspartame because the sugarless sweetening and bulking agents used to replace sugar in traditional chewing gum is not as sweet as sugar. The aspartame is typically provided in a powdered form. Aspartame is known to degrade into non-sweetening decomposition products under certain conditions, particularly in the presence of water. Therefore it has been known to encapsulate aspartame to prevent it from contacting the degradation-enhancing components of chewing gum during normal commercial storage conditions.

Aspartame is typically only slightly water soluble and thus its release and perception can be slow to develop when used in chewing gum. As a result, efforts have been made to provide a fast release stabilized aspartame ingredient for chewing gum. U.S. Pat. No. 5,221,543 to Zibell et al. discloses such a fast release aspartame ingredient. The aspartame is mixed with a solvent and an agglomerating agent to form a damp mix. The damp mix is then dried and ground. The resulting aspartame ingredient can then be mixed into chewing gum compositions to give a fast release aspartame.

Many other sweetening compositions using aspartame have been developed. For example, U.S. Pat. No. 5,164,214 to Wild discloses a sweetening agent that can be made with aspartame and a de-aromatized and concentrated fruit juice. Some of these sweetening agents are suggested for use in chewing gum. For example, EPO Patent Application Publication No. 0 102 032 discloses a stabilized sweetening agent containing aspartame and an aqueous dispersing agent, such as water or aqueous solutions of isomerized sugar, sorbitol, reduced starch hydrolysates or coupling sugar. The sweetening agents contain aspartame in an amount sufficient to saturate the aqueous dispersing agent and further provide undissolved aspartame. It is reported that the aspartame is stable and, when used in chewing gum, has the "effect of increasing the time of sweetness." However, the examples of the sweetening agents disclosed have less than 4% aspartame in the sweetening composition.

Even though various aspartame sweetening agents are known, and some even suggested for use in chewing gum, further improvements are still possible. It is not believed that heretofore known liquid dispersions of aspartame have been widely used to make chewing gum. One reason for this may be the low level of aspartame in the aqueous aspartame compositions.

SUMMARY OF THE INVENTION

It has been found that a liquid dispersion containing at least 20% aspartame can be used to make chewing gum compositions.

In one aspect, the invention is a chewing gum composition comprising: a) about 5% to about 80% gum base; b) about 0.1% to about 10% flavor; c) about 5% to about 90% bulking and sweetening agent wherein the bulking and sweetening agent comprises a liquid dispersion comprising at least about 20% aspartame in the dispersion.

In a second aspect, the invention is a chewing gum product comprising: a) about 5% to about 80% gum base; b) about 0.1% to about 10% flavor; and c) about 5% to about 90% bulking and sweetening agent wherein the bulking and sweetening agent comprises an aqueous aspartame dispersion comprising aspartame:water at a ratio of between about 2:3 and about 2:1.

In a third aspect, the invention is a method of making a chewing gum composition comprising: a) providing about 5% to about 80% gum base, about 0.1% to about 10% flavor and about 5% to about 90% bulking and sweetening agent, the bulking and sweetening agent comprising an aqueous aspartame dispersion comprising at least 20% aspartame; and b) mixing the gum base, bulking and sweetening agent and flavor to make a chewing gum composition.

It has been found that a liquid dispersion containing at least 20% aspartame may be conveniently used to sweeten chewing gum. The liquid dispersion has a rapid dissolution rate, which improves mixing and thereby reduces the processing time for making chewing gum.

Unexpectedly, it has also been found that the sweetness profile of sugarless chewing gum is improved with the addition of a liquid dispersion of aspartame, compared to adding aspartame in its free (powdered) form. There is a faster release of the aspartame in the early part of the chew, which improves the overall sweetness perception.

BRIEF DESCRIPTION OF THE DRAWING

FIG. 1 is a graph showing the release rate of aspartame added to a gum formulation in a free (powdered) form, encapsulated form and liquid dispersion form.

DETAILED DESCRIPTION OF THE DRAWING AND PRESENTLY PREFERRED EMBODIMENTS OF THE INVENTION

As used herein, the term chewing gum includes chewing gum, bubble gum and the like. All percents are given in weight percent unless specified otherwise.

The liquid aspartame dispersion for use in the present invention has an aspartame content of at least about 20%. Preferably the dispersion is an aqueous dispersion having an aspartame:water ratio of between about 2:3 and about 2:1. The aspartame thus preferably constitutes about 20% to about 67% of the liquid dispersion.

Preferably the dispersion has a low viscosity to allow for easy pumping and processing. Because the aspartame is provided at a level higher than its solubility, it is beneficial to include a food polymer to help keep the aspartame in suspension. Also, to prevent degradation of the aspartame in an aqueous environment, it is preferable that the pH of the dispersion be optimized for a maximum shelf life.

A preferred aqueous aspartame dispersion is available from The NutraSweet Company as Custom Liquid 50™, which is reported to contain about 50% aspartame, 50% water, 0.2% food polymer, particularly sodium carboxymethyl cellulose, and 0.2% preservative/benzoate, particularly phosphoric acid and sodium benzoate. The pH of Custom Liquid 50™ is believed to be 4.0, providing a 90-day shelf life at 40° F.– 80° F. It is reported that Custom Liquid 50™ has 1% dissolved aspartame and the remaining aspartame is in suspension, providing an off-white, opaque liquid.

The preferred range for the liquid aspartame dispersion in gum is about 0.02% to about 2%, preferably about 0.05% to about 1%. When using Liquid Custom 50™ with other more traditional type sweeteners, the preferred range is about 0.02% to about 0.5%. Any additional high-intensity sweetener used with the liquid aspartame dispersion should be added to gum at about 0.01% to about 1.5%. The liquid aspartame dispersion can be used in any type of gum formula and is very beneficial to sugarless gum formulas.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and cocoa butter. Commonly employed waxes include paraffin, microcrystalline and natural waxes such as beeswax and carnauba. Paraffin waxes may be considered to be plasticizers. Microcrystalline waxes, especially those with a high degree of crystallinity, may be considered as bodying agents or textural modifiers.

The gum base typically also includes a filler component. Suitable fillers include calcium carbonate, magnesium carbonate, talc, dicalcium phosphate and the like. The filler may constitute between about 5% and about 60% of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

The insoluble gum base may constitute between about 5% to about 80% of the gum. More typically the insoluble gum base comprises between 10% and 50% of the gum, and most often about 20% to about 35% of the gum. The present invention contemplates employing any commercially acceptable gum base.

The water-soluble portion of the chewing gum may further comprise sweeteners, softeners, flavoring agents and combinations thereof. The sweeteners often fulfill the roll of bulking agents in the gum. As used herein, the term "bulking and sweetening agent" comprises not only those ingredients that perform both bulking and sweetening functions, but also combinations of ingredients that together perform the functions, such as combinations of low sweetness bulking agents and high-intensity sweeteners.

Sugarless sweeteners include sorbitol, mannitol, xylitol, hydrogenated starch hydrolysates, maltitol and the like, alone or in combination. In sugar gums, typical bulking agents include sucrose, dextrose, maltose, dextrin, dried invert sugar, fructose, levulose, galactose, corn syrup solids and the like, alone or in combination. High-intensity sweeteners include aspartame, alitame, dihydrocalcones, sucralose, cyclamate, saccharin, acesulfame K, glycyrrhizin, thaumatin, monellin, stevioside and the like, alone or in combination. The bulking and sweetening agent generally will comprise from about 5% to about 90% of the gum composition, and more preferably about 20% to about 80% of the gum composition, and most preferably about 30% to about 60% of the gum composition.

The liquid aspartame dispersion of the present invention comprises part of the bulking and sweetening agent. Other traditional bulking and sweetening agents will be used along with the liquid aspartame dispersion. For example, in a sugarless gum, sorbitol may be used for most of the bulking and sweetening agent.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Where it is desirable to add corn syrup or hydrogenated starch hydrolysate (HSH) syrup to the gum composition without adding all of the water that comes with commercial forms of the syrup, the syrup may be co-evaporated with glycerine or equivalent compounds as disclosed in U.S. Pat. No. 4,671,967 (incorporated herein by reference) before it is used to make the gum composition. Such co-evaporated syrups typically comprise less than about 10% water and are used at levels between about 3.5% and about 10% of the gum composition.

A flavoring agent may be present in the chewing gum in an amount within the range of from about 0.1% to about 10%, preferably from about 0.5% to about 3% of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chucks or casting into pellets.

Generally, the ingredients are mixed by first melting the gum base and adding it to the running mixer. The base may also be melted in the mixer itself. Color or emulsifiers may also be added at this time. Any syrup is preferably added at this time, along with a portion of the bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

EXAMPLES

Chewing gum was made with different forms of aspartame. Comparative Example A contains 0.221% free powdered aspartame. Comparative Example B contains 0.261% encapsulated aspartame. The encapsulated aspartame is 15% encapsulant and 85% aspartame, providing 0.221% aspartame. Example 1 is the preferred embodiment of the invention, and contains 0.442% liquid aspartame dispersion, Liquid Custom 50™. The gum samples were chewed for 12 minutes and then were analyzed by high pressure liquid chromatography to determine the release rate of aspartame at 2, 4, 8 and 12 minutes. The following table contains the gum formulas and percent by weight. The release profile of each type of aspartame is shown in FIG. 1.

TABLE 1

| Ingredients | Comp. Ex. A | Comp. Ex. B | Ex. 1 |
| --- | --- | --- | --- |
| Sorbitol | 49.208 | 49.168 | 48.987 |
| Gum Base | 24.43 | 24.43 | 24.43 |
| Lycasin Syrup* | 2.14 | 9.14 | 9.14 |
| Mannitol | 8.00 | 8.00 | 8.00 |
| Glycerin | 7.28 | 7.28 | 7.28 |
| Flavor | 1.571 | 1.571 | 1.571 |
| Free Aspartame | 0.221 | — | — |
| Lecithin | 0.15 | 0.15 | 0.15 |
| Encapsulated Aspartame (85% aspartame) | — | 0.261 | — |
| Liquid Aspartame | — | — | 0.442 |

*67.5% hydrogenated starch hydrolysate solids, 25% glycerin and 7.5% water.

As seen in FIG. 1, the liquid aspartame releases quickly in chewing gum. This is advantageous to chewing gum as an overall flavor enhancer. This quick release of sweetness is an unexpected advantage that was discovered from testing of the present invention.

It may be desirable to have only a portion of the aspartame used in the gum composition release quickly. In that case, additional free and/or encapsulated aspartame can also be added to the gum composition. Of course other sweeteners, in either a fast release, slow release or natural form may be used with the liquid aspartame dispersion.

It should be appreciated that the compositions and methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A chewing gum composition comprising:

a) about 5% to about 80% gum base;

b) about 0.1% to about 10% flavor;

c) about 5% to about 90% bulking and sweetening agent wherein the bulking and sweetening agent comprises a liquid dispersion comprising at least about 20% aspartame in the dispersion.

2. The chewing gum composition of claim 1 wherein the liquid dispersion is an aqueous dispersion comprising aspartame and water at an aspartame:water ratio of between about 2:3 and about 2:1.

3. The chewing gum composition of claim 1 wherein the liquid dispersion comprises between about 20% and about 67% aspartame.

4. The chewing gum composition of claim 1 wherein the liquid aspartame dispersion comprises about 0.02% to about 2% of the chewing gum composition.

5. The chewing gum composition of claim 1 wherein the liquid aspartame dispersion comprises about 0.05% to about 1% of the chewing gum composition.

6. The chewing gum composition of claim 1 further comprising co-evaporated glycerin and hydrogenated starch hydrolysate syrup.

7. A chewing gum product comprising:

a) about 5% to about 80% gum base;

b) about 0.1% to about 10% flavor; and c) about 5% to about 90% bulking and sweetening agent wherein the bulking and sweetening agent comprises an aqueous aspartame dispersion comprising aspartame:water at a ratio of between about 2:3 and about 2:1.

8. The chewing gum product of claim 7 wherein the gum composition is a sugarless chewing gum.

9. The chewing gum product of claim 7 wherein the aqueous aspartame dispersion further comprises a food polymer.

10. The chewing gum product of claim 9 wherein the food polymer comprises sodium carboxymethyl cellulose.

11. The chewing gum product of claim 7 wherein the aqueous aspartame dispersion comprises about 0.02% to about 0.5% of the gum composition and the bulking and sweetening agent further comprises sorbitol.

12. The chewing gum product of claim 7 wherein the aqueous aspartame dispersion comprises about 50% water and about 50% aspartame.

13. A method of making a chewing gum composition comprising:

a) providing about 5% to about 80% gum base, about 0.1% to about 10% flavor and about 5% to about 90% bulking and sweetening agent, the bulking and sweetening agent comprising an aqueous aspartame dispersion comprising at least 20% aspartame; and b) mixing the gum base, bulking and sweetening agent and flavor to make a chewing gum composition.

14. The method of claim 13 wherein the ratio of aspartame to water in the aqueous dispersion is between about 2:3 and about 2:1.

15. The method of claim 13 wherein the bulking and sweetening agent comprises an additional sweetener and the aqueous aspartame dispersion is mixed into the gum composition as an ingredient separate from the additional sweetener.

16. The method of claim 15 wherein the additional sweetener comprises sorbitol.

17. The method of claim 13 wherein the aqueous aspartame dispersion comprises about 50% aspartame and about 50% water.

18. The method of claim 13 further comprising the step of co-evaporating glycerin and hydrogenated starch hydrolysate syrup to a moisture level of below about 10% and mixing the co-evaporated syrup into the composition at a level of between about 3.5% to about 10% of the gum composition.

19. The method of claim 13 wherein the aqueous aspartame dispersion comprises about 0.2% food polymer.

20. The method of claim 19 wherein the food polymer comprises sodium carboxymethyl cellulose.

* * * * *